United States Patent [19]

Saito et al.

[11] 4,449,861
[45] May 22, 1984

[54] SYSTEM FOR TRANSPORTING PLASTICS ARTICLES

[75] Inventors: Hisatoshi Saito; Shuzo Fujii; Itaru Takase; Akihiko Nakamura; Yoshihiro Hara, all of Tokyo, Japan

[73] Assignees: Q.P. Corporation; Denka Engineering Kabushiki Kaisha, both of Japan

[21] Appl. No.: 347,327

[22] Filed: Feb. 9, 1982

[51] Int. Cl.³ ............................................ B65G 51/02
[52] U.S. Cl. ...................................... 406/39; 406/79; 406/144; 406/163; 406/193
[58] Field of Search ................. 406/79, 153, 144, 193, 406/163, 175, 39–43; 414/373, 376, 381, 573, 414/574; 222/528, 529, 547, 564; 296/39 A

[56] References Cited

U.S. PATENT DOCUMENTS

| | | | |
|---|---|---|---|
| 2,478,326 | 8/1949 | Scarth | 406/193 |
| 2,616,758 | 11/1952 | Meyers | 222/529 |
| 2,662,667 | 12/1953 | Simon | 222/564 X |
| 3,393,920 | 7/1968 | Ehrlich | 296/39 A X |
| 3,416,841 | 12/1968 | Valentine | 406/153 X |
| 4,243,158 | 1/1981 | Negosta | 222/564 X |
| 4,247,228 | 1/1981 | Gray et al. | 406/39 |

FOREIGN PATENT DOCUMENTS 55-98025  7/1980  Japan .................................. 406/39

Primary Examiner—John J. Love
Assistant Examiner—Paul A. Sobel
Attorney, Agent, or Firm—McGlew and Tuttle

[57] ABSTRACT

This invention provides an improved system for transporting plastics articles such as containers for foods from one place such as a plastics articles-manufacturing plant to another such as a goods-charging plant and encompasses vehicle means for transporting the articles in large quantities, devices which receive the articles from the vehicle means, convey the articles and discharge them into a pipeline for pneumatic conveyance and a device which is installed at the delivery end of the pipeline, which stores the articles and which is provided with means capable of discharging them therefrom at a predetermined rate.

6 Claims, 12 Drawing Figures

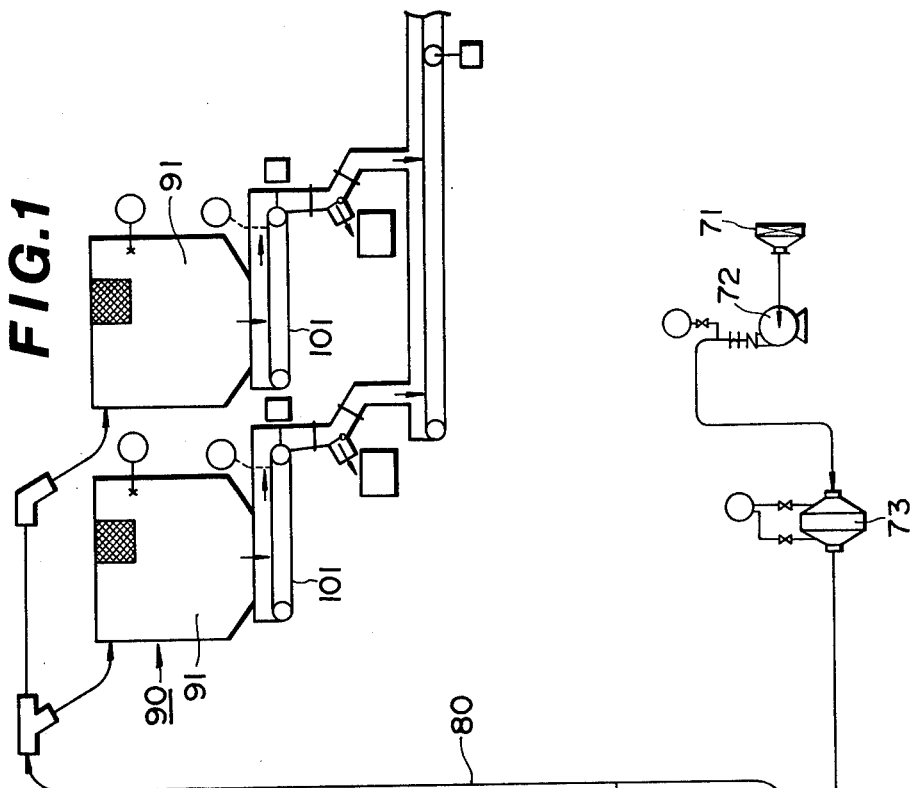
FIG.1
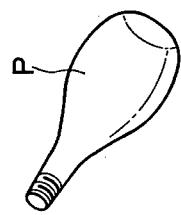
FIG.2
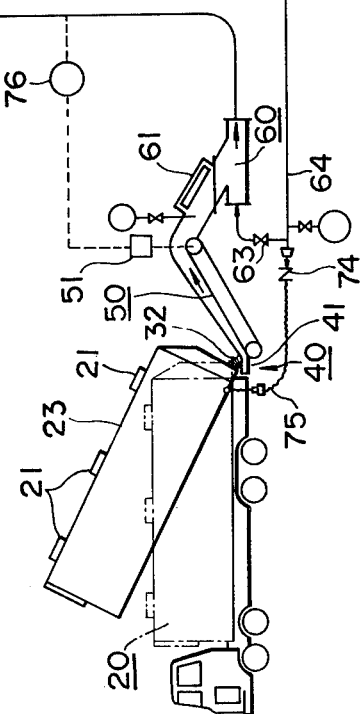

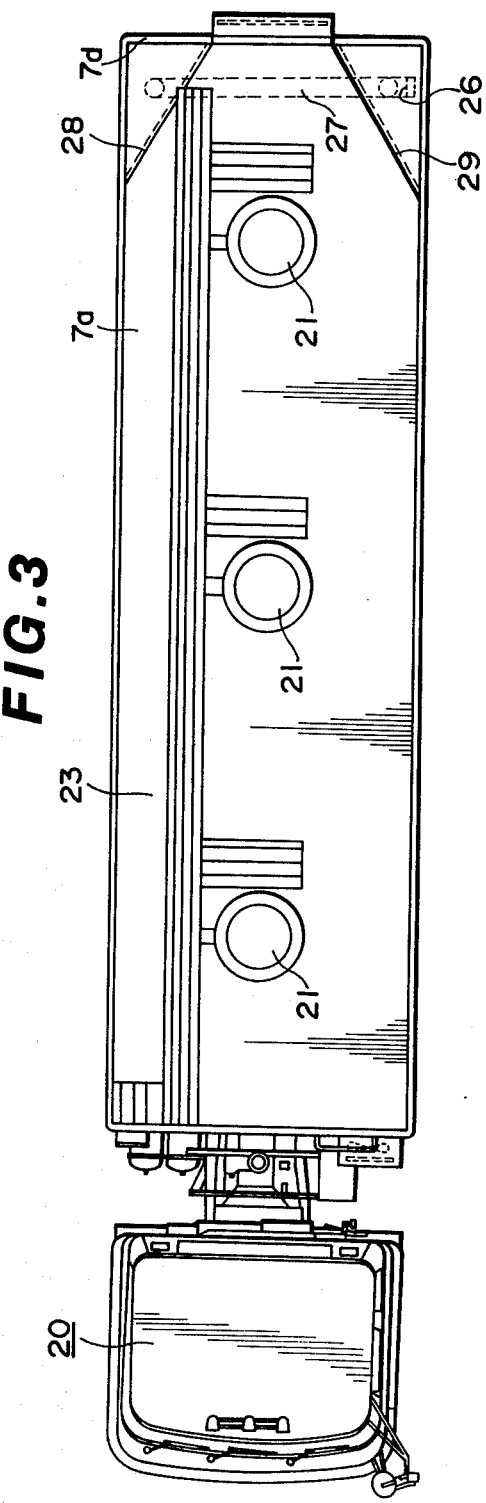
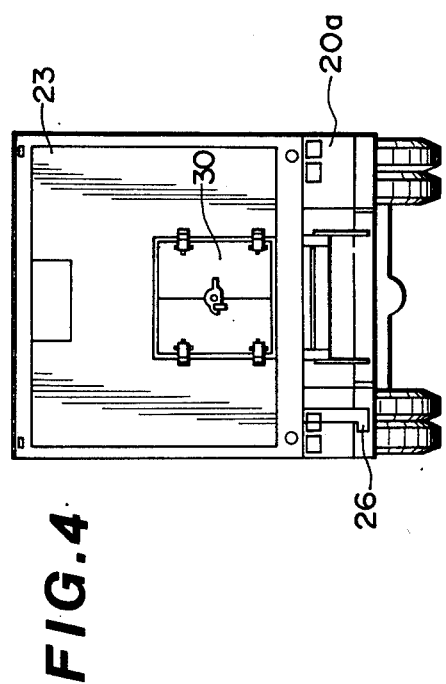

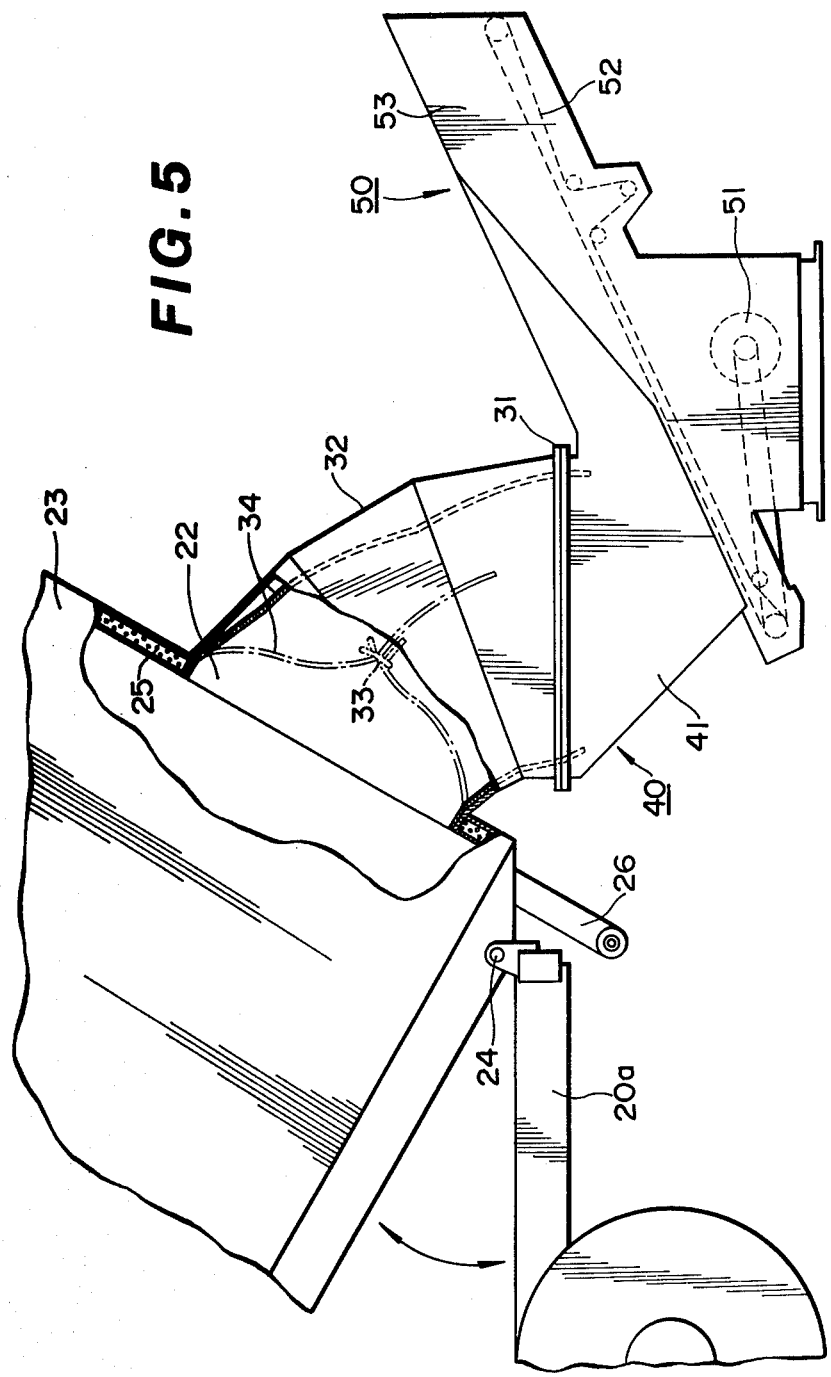

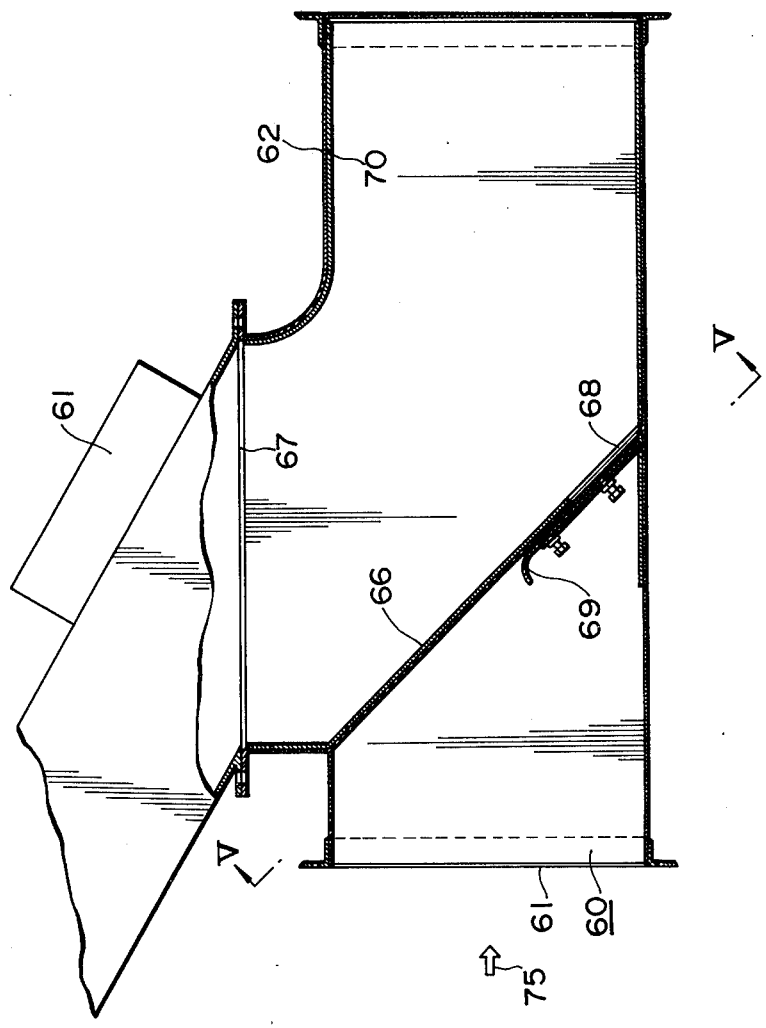

SYSTEM FOR TRANSPORTING PLASTICS ARTICLES

BACKGROUND OF THE INVENTION

1. Field of the Invention

This invention relates to a transport system for transporting hollow articles formed of plastics material, and more particularly to a transport system for transporting various kinds of such hollow articles in large quantities from a manufacturing factory or a warehouse of the articles to the place where they are used for bottling, goods-charging, packing or packaging or for other purposes, or where the articles are stored to be used for such purposes.

2. Description of the Prior Art

In general, in case where hollow articles, such as containers, dolls, etc., made of plastics material, such as polyethlene or other thermoplastic synthetic resin, by blow-molding are transported for such purposes as aforementioned, they are transported by means of vehicles such as trucks after they have been packed into bags such as vinyl bags and then into boxes such as cardboard boxes.

Such a way of transport requires not only steps of packing the hollow articles (hereinafter called "plastics articles") into the bags and into the boxes, but also a step of loading the plastics articles on the vehicles, a step of unloading the plastics articles therefrom and a step of opening the boxes and bags, thus requiring much labor and time. Further, the amount of the plastics articles which can be loaded on a vehicle is considerably limited, since they are packed into the boxes which are bulky, so that the amount of the plastics articles which can be transported at one time is considerably small and the transport efficiency is very poor. Furthermore, as a large amount of expendable supplies such as vinyl bags and boxes are required, the total cost required for carrying out transport of the plastics articles becomes considerably high.

In view of the foregoing drawbacks and inconveniences, a pneumatic transport system comprising a pipeline through which the plastics articles are pneumatically conveyed in a non-packed state has been proposed to be put in the place of such an inefficient conventional transport method. In the conventional pneumatic transport system, however, no effective measures have been employed to protect the plastics articles during transport and/or storage thereof. As a result, during transport and/or storage of the plastics articles, they are often caused to be permanently deformed by external forces applied thereto and/or by thermal expansion. In addition, they tend to be charged with static electricity, and their outer surfaces are often abraded while they are pneumatically conveyed through the pipeline of the system, thereby causing fibrous or thin fabric-like plastics pieces to be produced. In case where the plastics articles are containers for foods, abrasions of their surfaces cause the commercial values of the contents to be deteriorated. Moreover, a problem of environmental pollution will be caused by production of such fibrous or thin fabric-like plastics pieces as waste.

SUMMARY OF THE INVENTION

The principal object of the present invention is to provide an improved system for transporting hollow plastics articles which is capable of transporting them in a non-packed state from a manufacturing factory or a warehouse of the articles to the place such as a plant where they are used and which can eliminate the drawbacks indicated with the conventional method and system for transporting the plastics articles.

The transport system of the present invention includes vehicle means for transporting hollow plastics articles in large quantities, devices which receive the articles from the vehicle means, convey the articles and discharge them into a pipeline for pneumatic conveyance and a device which is installed at the end of the pipeline, which stores the plastics articles and which is provided with means capable of discharging them therefrom at a predetermined rate.

BRIEF DESCRIPTION OF THE DRAWINGS

FIG. 1 is a diagrammatic view illustrating one embodiment of the transport system according to the present invention;

FIG. 2 is a perspective view showing an example of the hollow plastics article to be transported according to the present invention;

FIGS. 3 and 4 are a plan view and a rear view of a vehicle as employed in the embodiment;

FIG. 5 is an enlarged schematic side view, illustrating the state in which the vehicle is coupled to a hopper device;

FIG. 6 is an enlarged cross-sectional view of an ejector;

DESCRIPTION OF THE PREFERRED EMBODIMENTS

Figure 7:
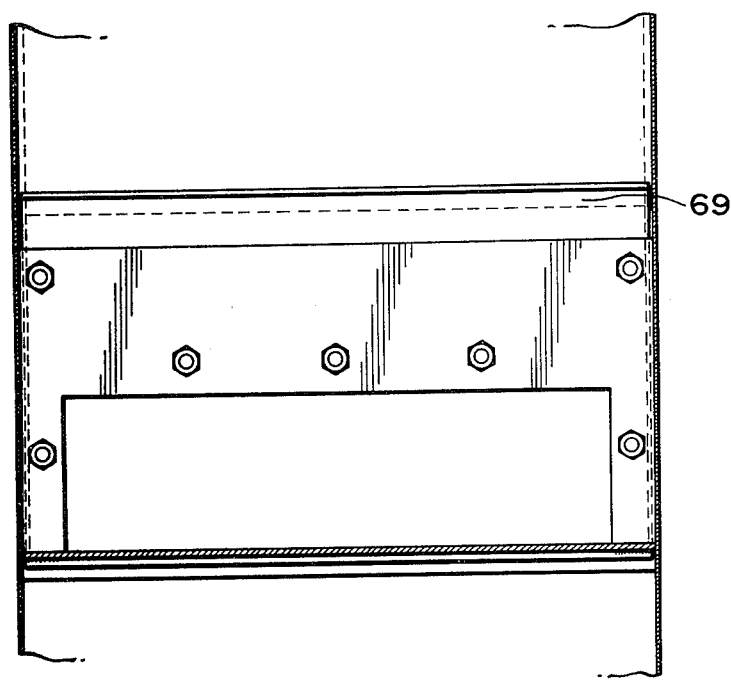
FIG. 7 is a cross-sectional view taken along the line V—V of FIG. 6.

The invention will now be described in conjunction with the accompanying drawings.

Referring now to FIG. 1 which illustrates the whole transport system according to the present invention, there is shown a vehicle 20 for transporting hollow plastics articles. The hollow plastics articles, for example, containers P for foods made of soft polyethylene, shown in FIG. 2, are transported by the vehicle in large quantities, say, of the order of tens of thousands from a manufacturing factory of the articles to a hopper device 40 and are fed into a hopper 41 thereof.

The containers fed into the hopper 41 are conveyed through a feed device 50, discharged by an injector 60 into a pipeline 80 at a rate of 15 to 20 containers per second conveyed therethrough and are stored in a storage device 90. The containers are then supplied at a predetermined rate to a goods-charging machine, not shown.

Details of the devices which constitute the transport system of the present invention will now be described below with reference to FIGS. 3 to 12. First, the vehicle 20 has a large-capacity vehicle container or van 23 which is pivotally mounted on a chassis 20a by means of a hinge 24 so as to be tilted within the angular range of 30° to 40° with respect to the chassis. The van 23 has a plurality of inlets 21 for the plastics articles in the top wall thereof each of which inlets is provided with a lid.

In the rear wall of the van 23 there is provided an outlet 22 for the plastics articles.

The van 23 assumes the shape of an elongated box as a whole. Each of the walls of the van 23 comprises a roof sheet, a foamed material, a plywood and a stainless steel plate that are laminated in the order mentioned from the outer side toward the inner side to constitute a heat-insulating wall 25. The inner surfaces of the walls are smoothly finished so that the plastics articles will not be damaged when contacting them. Although not shown, air inlet fans with a dust-removing filter and air outlet fans are provided in portions of the heat-insulating walls 25.

In FIG. 3, reference numeral 26 denotes a connection portion for supplying compressed air into the van 23 when it is tilted. The compressed air is supplyed into the van 23 through an air duct 27 and through gaps formed in the upper portions of guide plates 28, 29 for guiding discharge of the plastics articles, so that air may be stored in the van 23 under pressure.

Referring now to FIG. 4, the rear wall of the van 23 is provided with a door 30 for the outlet 22 which is constructed nearly in the same manner as the heat-insulating wall 25. As shown in FIG. 5, a bellows 32 made of a water-proof nylon canvas is secured at one end to the edges of the outlet 22 the other end of which is provided with a flange 31. This bellows 32 is equipped on the inside thereof, with a pliable guide cylinder 34 made of a nylon canvas and provided with fastener means 33 for closing and opening its outer end.

With the aforementioned vehicle 20, clean air can be supplied into the van 23 at all times during transporting of the plastics articles by the aforesaid ventilating means, whereby the interior of the van can always be maintained clean. In summer season, in particular, the temperature in the van can be prevented from being excessively raised, so that the plastics articles can be prevented from being deformed by their thermal expansion.

To discharge the plastics articles out of the van 23, the bellows 32 is extended as shown in FIG. 5, the flange 31 is joined to a flange of a hopper 41 of a hopper device 40, the fastener means 33 of the guide cylinder 34 is unfastened by hand. The outer end of the pliable guide cylinder 34 then opens within the extended bellows 32 and the plastics articles in the van are smoothly discharged therefrom without being abraded.

The tiltable van is supplied with compressed air, so that the plastics articles are caused to be pushed out of the outlet 22 under air pressure, thus enabling the articles to be successively and smoothly supplied into the hopper device 40. The plastics articles P thus supplied into the hopper device 40 are then conveyed by a feed device 50 which is connected thereto. This feed device 50 comprises a guide duct 53, a belt conveyor 52 provided longitudinally along the bottom of the duct 53 and a motor 51 for driving the conveyor 52, as shown in FIG. 5. The plastics articles P supplied into the duct 53 through the hopper 41 are conveyed by the belt conveyor 52 to an injector 60 that is communicated with the feed device 50.

Reference numeral 61 denotes a port for adjusting intake of air by the ejector. FIGS. 6 and 7 show the internal structure of the injector 60. Reference numeral 62 denotes a drum portion of which the front end is connected to a pipeline 80 and of which the rear portion is connected to an air pipe 64 via an air valve 63 shown in FIG. 1, so that it can be supplied with pressurized air from an air compressor 72. Reference numeral 66 indicates a tilted plate provided under an inlet port 67 of the injector 60. The tilted plate 66 has an adjustable opening 68 at the lower portion thereof. Reference numeral 69 denotes a plate for partly closing the port 61 to adjust the flow rate of air.

The inner surface of the ejector, particularly the inner surface along which the articles are conveyed and part of the inner surface of the pipeline are provided with a lining layer 70 which will be mentioned later.

In FIG. 1, reference numeral 71 denotes a suction filter, 72 denotes an air compressor for providing the van 23 and the injector 60 with pressurized air, and 73 denotes a secondary air filter. The compressor air is supplied into the van 23 via an air valve 74 and a connecting air pipe 75 and into the injector 60 via an air valve 63. Thus, the plastics articles introduced into the injector 60 from the feed device 50 are caused to be pneumatically injected into and conveyed through the pipeline 80.

Reference numeral 76 denotes a control device which detects air pressure in the pipeline 80 and controls the drive motor 51 of the feed device 50. As the pressure in the pipeline 80 increases in proportion to the rise in the density of plastics articles in the pipeline 80, the control device 76 works to reduce rotation of the motor 51 of the feed device so that the amount of feeding of the plastics articles into the ejector is controlled and the pipeline 80 is prevented from being clogged.

As previously mentioned, outer surfaces of the plastics articles tend to be abraded as they are conveyed through the injector 60 and pipeline 80.

The inventors of the present invention have found through various tests that main cause that the plastics articles are abraded and scarred during conveyance theireof does not consist in their mutual contact but consists in their frictional or abrasive contact with the inner surface of the pipeline 80 by their collision therewith. The inventors have further conducted tests in regard to the lining material on the inner surface of the pipeline, and have found that the problem could be solved if a soft and elastic material is used as a lining material and that a rigid material is unsuitable for the lining material, even if it is of small frictional resistance.

The word "soft" as used herein means that the lining material is softer than the plastics articles. Further, the term "elastic material" represents those which are not damaged by the collision of plastics articles during pneumatic conveyance thereof but which are capable of absorbing shocks of the collision.

Figure 8:
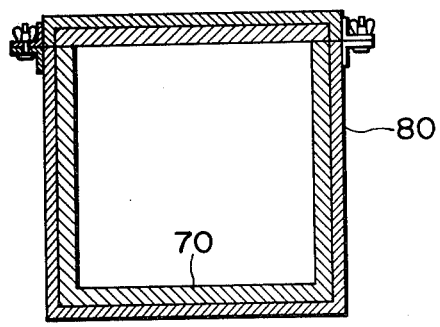
FIG. 8 is a cross-sectional view of a pipeline.
Figure 9:
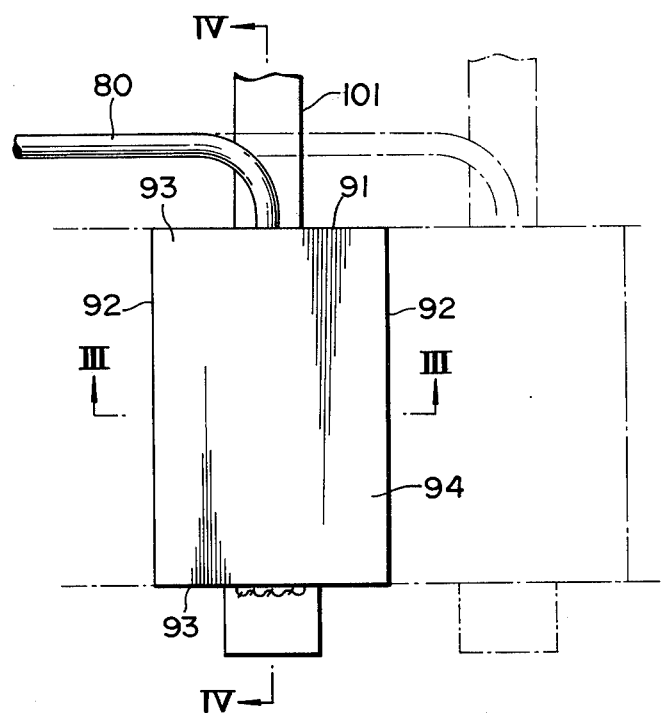
FIGS. 9, 10 and 11 are a plan view of a storage device, a cross-sectional view taken along the line III—III of FIG. 9 and a cross-sectional view taken along the line IV—IV of FIG. 9.

In case where the plastics articles to be transported are containers of polyethylene such as shown in FIG. 2, the linings 70 shown in FIGS. 6 and 8 are preferably formed of a soft chloroprene rubber sheet having a tensile strength of 150 to 600 kg/cm$^2$, a stretching ratio of 300 to 700% and a thickness of 3 to 4 mm.

It has been experimentally proved that the lining material consisting of the above-mentioned chloroprene rubber sheet features longer life than the conventional lining materials such as a polyethylene-coated cloth and exhibits excellent properties in regard to restraining the formation of the aforesaid waste (fibrous and/or fabric-like plastics pieces), static electricity, and abrasions and scars on the surfaces of the plastics articles. The lining layer needs not be formed on the whole surfaces of the pipeline 80.

The lining layer 70, however, should be provided at least on the portions of the pipeline where the aforementioned fibrous or fabric-like plastics pieces tend to be formed, such, for example, as bent or curved portions.

It is preferable that the pipe 80 has a square shape in cross-section and is constructed such that one longitudinally extending side wall can be opened so that the inside of the pipe may be cleaned and/or repaired.

The containers P conveyed through the pipeline by the high-speed air stream are discharged into one or a plurality of storage devices 90 installed at the end of the pipeline. It has already been mentioned that the soft plastics articles tend to be deformed by the temperature and the pressure that changes depending upon the temperature. When the plastics articles are stored in large quantities, there arises another probability that the articles stored in the lower portion of the storage or storehouse may be permanently deformed by the weight of the articles stacked thereon. In the case of polyethylene containers, experience teaches that the articles should not be stacked higher than about 2 meters. Therefore, limitation is imposed not only on the capacity and on the shape of the storage, but also on the construction of the storage for discharging or taking out the stored articles.

The storage 91 or storehouse provided in accordance with the present invention has overcome the above-mentioned difficulties, and is designed so as to be capable of storing a large amount of the plastics articles.

As shown in FIGS. 9 to 12, the storage 91 comprise a pair of side walls 92, a pair of end walls 93, a top wall 94, tilted side walls 95 connected at upper ends to the side walls 92 and vertical side plates 96 depending from lower ends of the tilted walls 95 and defining an outlet port 97.

The walls are constructed nearly in the same manner as the heat-insulating walls 25 of the van 23 of the aforementioned vehicle.

Figure 10:
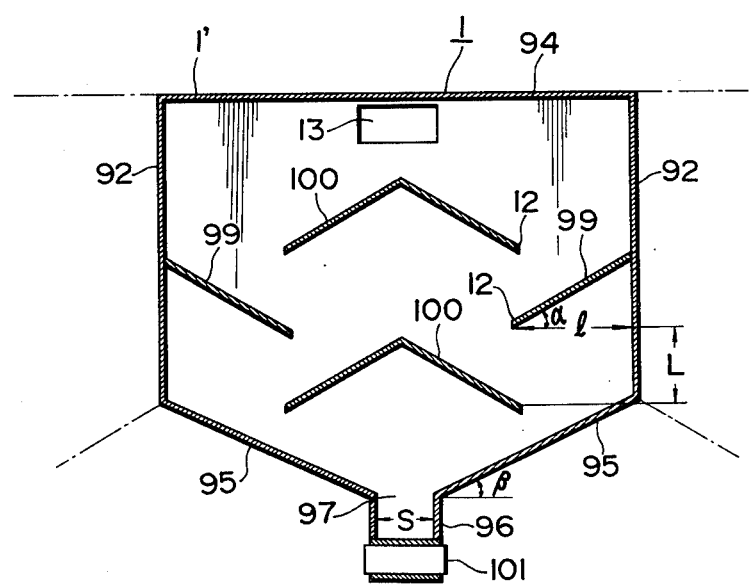
Figure 11:
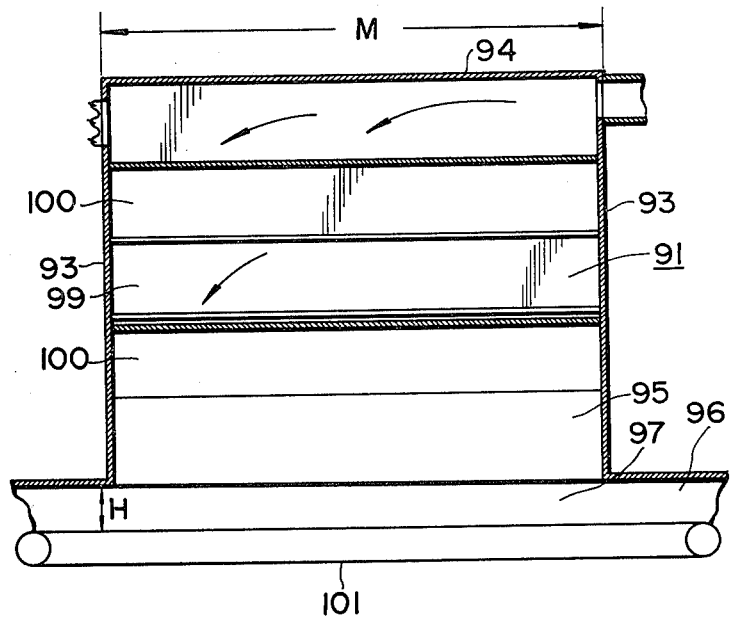

Tilted baffle plates 99 are secured to the inner surfaces of the side walls 92, and roof-shaped baffle plates 100 are provided in the central portion, the tilted baffle plates 99 and the roof-shaped baffle plates 100 being disposed in zig-zag manner, as shown in FIG. 10. The tilted angle $\alpha$ of baffle plates 99, 100 are determined depending upon what angle is best suited for repose of the articles to be stored. In the case of the polyethlene containers (300 cc), the tilted angle $\alpha$ will be from 20° to 30°. The same idea also holds true with regard to the tilted angle $\beta$ of the tilted side walls 95. The distance L between the end of each baffle plate 99 and the end of each baffle plate 100 in a vertical plane of the storage should be more than two times the diameter of the container P.

The vertical side plates 96 are located along the edges on both sides of the conveyor 101 over a length of greater than the length M of the side walls 92, and form the outlet port 97 immediately above the conveyor 101, and also serve as a guide for the conveyor.

The plastics articles are supplied into the storage through the inlet port 67 in the lengthwise direction of the storage device, i.e., in the direction in parallel with the moving direction of the conveyor and in parallel with the baffle plates 99, 100. Therefore, the plastics articles which fell on the baffle plates slide down therealong, and gradually pile from the bottom of the storage. Even when the plastics articles are accumulated up to the upper portion of the storage, the plastics articles located in the lowermost portion of the storage do not receive such a load that may cause their permanent deformation owing to the function of baffle plates.

Furthermore, even when the temperature of the external atmosphere is changed while the articles are being stored, the temperature in the storage 91 changes little owing to the heat-insulating walls. Therefore, deformation due to the expansion and contraction of the air can be prevented, and the articles can be stored for extended periods of time. Mentioned below is the case when the plastics articles stored in the storage 91 are to be discharged therefrom.

As the conveyor 101 is driven, the plastics articles on the conveyor belt are conveyed along the vertical side plates 96 in the state in which they are in contact with one another or in the state in which they are separated from one another.

As the plastics articles on the conveyor are conveyed and discharged out of the outlet port 97, the plastics articles above port fall on the conveyor 101 directly or after having slid on the tilted side walls 95 and baffle plates, and are continuously conveyed by the conveyor.

Any belt such as a mesh belt of a vinyl chloride resin or a flat belt of rubber material can be used as a belt for the belt conveyor 101. When a slipping factor of plastics articles is taken into consideration, however, the rubber flat belt having a large coefficient of friction is preferred. The length of the outlet port 97 should be at least equal to, or greater than, the length M of side walls 92 of the storage. Further, the outlet port 97 maintains a height H as determined by the vertical side plates 96 on both sides. Therefore, the plastics articles are not caused to be upwardly driven into the storage by movement of the conveyor belt. Accordingly, the plastics articles can be conveyed to a predetermined place at a predetermined rate continuously without the need of reducing the speed of the belt. The width S of the outlet port can be suitably determined depending upon the desired rate of conveyance of the plastics articles. With the construction of the storage device according to the present invention, the width of the outlet port and the width of the conveyor belt can be set to minimal values, and the cost required for installing the storage device can be minimized as it is simple in construction. Moreover, the space required for the belt can also be minimized, and the belt conveyor can be easily mounted. Furthermore, the plastics articles can be prevented from being damaged.

Figure 12:
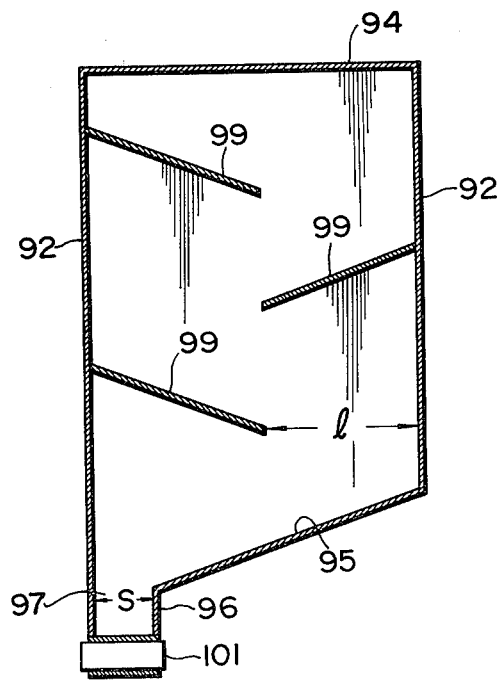
FIG. 12 is a cross-sectional view of another form of a storage device according to the present invention.

According to the present invention, the tilted side walls 95 may be constructed as shown in FIG. 12 depending upon the site of installation.

What is claimed is:

1. A system for transporting hollow plastics articles comprising in combination vehicle means for transporting the articles, said vehicle means having a tiltably mounted container which comprises heat-insulating walls and which is provided, at its upper portion, with a plurality of inlets for the articles and, at its rear portion, with an outlet for the articles and means for introducing pressurized air into said container, said tiltably mounted container being also provided, at the outlet thereof, with folding guide means comprising a bellows secured at one end to said rear portion and a pliable guide cylinder located on the inside thereof for guiding the articles to be discharged out of said container, a hopper device having a hopper adapted to be interconnected with said outlet through said folding guide means, a feed device coupled to said hopper device and arranged to convey the hollow plastics articles received from said hopper device, a pipeline through which the articles are transported and which comprises individual pipe sections, injector means interconnected with said feed device and said pipeline for pneumatically injecting into and conveying through said pipeline the articles conveyed from said feed device, said injector means and said pipeline being lined with a sheet of pliable and elastic material at least at their inner surfaces with which the articles may come into contact, and a storage device installed at the delivery end of said pipeline and having means for discharging the hollow plastics articles stored therein, said storage device comprising a storage having at its upper portion an inlet port to which the delivery end of said pipeline is connected and at its bottom portion an outlet port, and a belt conveyor located immediately under said outlet port, said storage also having baffle plates disposed therein and tilted at an angle of 20° to 30° in a zig-zag manner, respectively, each of the individual pipe sections of said pipeline having a square cross-section shape and being constructed such that at least one of the longitudinally extending walls thereof can be fully opened so that the linings of each said pipe section may be cleaned and repaired.

2. A system for transporting hollow plastics articles as set forth in claim 1, wherein the container of said vehicle means is provided with means for supplying thereinto clean air.

3. A system for transporting hollow plastics articles as set forth in claim 1, wherein the hollow plastics articles are containers for foods made of soft plastics material, such as polyethylene.

4. A system for transporting hollow plastics articles as set forth in claim 1, wherein said pliable guide cylinder is made of a nylon canvas and is provided with fastener means for closing and opening the outer end thereof.

5. A system for transporting hollow plastics articles as set forth in claim 1, wherein the linings of said injector means and pipeline are formed of a soft chloroprene rubber sheet having a tensile strength of 150 to 600 $KG/cm^2$, a stretching ratio of 300 to 700% and a thickness of 3 to 4 mm and being softer than the hollow plastics articles.

6. A system for transporting hollow plastics articles as set forth in claim 1, wherein said storage comprises heat-insulating walls.

* * * * *